United States Patent [19]

Dwyer et al.

[11] Patent Number: 4,924,332

[45] Date of Patent: * May 8, 1990

[54] DISPLAY FOR MODULAR DICTATION/TRANSCRIPTION SYSTEM

[75] Inventors: John J. Dwyer, Stratford; David B. Chamberlin, Milford; Emil F. Jachmann, Greenwich, all of Conn.

[73] Assignee: Dictaphone Corporation, Stratford, Conn.

[ * ] Notice: The portion of the term of this patent subsequent to Dec. 27, 2005 has been disclaimed.

[21] Appl. No.: 319,906

[22] Filed: Mar. 6, 1989

Related U.S. Application Data

[63] Continuation of Ser. No. 894,993, Aug. 8, 1986, abandoned.

[51] Int. Cl.⁵ .............................................. G11B 15/18
[52] U.S. Cl. ..................................... 360/72.2; 360/69; 360/74.4; 360/137
[58] Field of Search ................. 360/72.2, 69, 71, 72.1, 360/72.3, 74.4, 137

[56] References Cited

U.S. PATENT DOCUMENTS

| 4,200,893 | 4/1980 | Matison | 360/72.1 |
|---|---|---|---|
| 4,224,644 | 9/1980 | Lewis et al. | 360/72.2 |
| 4,237,540 | 12/1980 | Sato | 360/137 X |
| 4,352,173 | 9/1982 | Titus et al. | 369/27 |
| 4,377,825 | 3/1983 | Kasubuchi et al. | 360/72.2 X |
| 4,410,923 | 10/1983 | Patel | 360/137 |
| 4,577,252 | 3/1986 | Kobayashi | 360/137 |
| 4,627,001 | 12/1986 | Stapleford et al. | 369/29 X |
| 4,677,501 | 6/1987 | Saltzman et al. | 360/137 X |

FOREIGN PATENT DOCUMENTS

| 55-48890 | 4/1980 | Japan | 360/137 |
|---|---|---|---|
| 55-52573 | 4/1980 | Japan | 360/137 |
| 55-77067 | 6/1980 | Japan | 360/72.2 |
| 57-109102 | 7/1982 | Japan | 360/69 |
| 58-114316 | 7/1983 | Japan | 360/69 |
| 60-1670 | 1/1985 | Japan | 360/72.2 |
| 60-253043 | 12/1985 | Japan | 360/72.2 |
| 61-187185 | 8/1986 | Japan | 360/137 |

Primary Examiner—John H. Wolff
Attorney, Agent, or Firm—Robert H. Whisker; David E. Pitchenik; Melvin J. Scolnick

[57] ABSTRACT

A dictation transcription system having a recording/playback module and a display module which are detachably connectable to form an integral structure. The display module provides a visual display of the length, locations and types of messages by storing and utilizing display data. This display data is generated during a dictate operation and, when dictation is "finished", the display data is recorded on the record medium. Subsequently, and preferably, prior to transcription of the dictated messages, the record medium is scanned for the display data which then controls a transcriptionist's display module to reproduce the visual indication originally derived during dictation.

27 Claims, 7 Drawing Sheets

DISPLAY FOR MODULAR DICTATION/TRANSCRIPTION SYSTEM

RELATED APPLICATIONS AND PATENTS

This application is a continuation of U.S. application Ser. No. 894,993, filed Aug. 8, 1986; now abandoned.

The portion of the term of any patent issuing on this application which extends beyond the term of U.S. Pat. No. 4,794,474 to Dwyer et al., issued Dec. 27, 1988 has been disclaimed, and any patent issuing on this application shall be enforceable only so long as title to such patents runs with title to the aforementioned U.S. Pat. No. 4,794,474.

BACKGROUND OF THE INVENTION

This invention relates to dictation/transcription systems for the recording and retrieval of audio signals such as voice signals and, more particularly, to a display device for a dictation/transcription system for display of information relating to the usage of a recording/playback unit.

A variety of display devices for dictation/transcription equipment is presently available, such as lamps, LED's, liquid crystal displays and the like. By way of example of display devices for dictation/transcription equipment which have been proposed, the following United States Patents are of interest.

Matison (U.S. Pat. No. 4,200,893) discloses the display of locations of information recorded on a tape recording medium, and a counting of revolutions of a reel of a tape transport to determine position of the recording tape.

Sander et al (U.S. Pat. No. 4,319,337) disclose the storage and display of information relating to the length and identity of recorded messages in a system employing multiple dictation stations.

Titus et al (U.S. Pat. No. 4,398,279) disclose a numerical readout of dictation segments and time available for dictation on a recording medium.

Titus et al (U.S. Pat. No. 4,399,527) disclose the use of registers for storing information as to the location of messages recorded on a recording medium, and the presentation of such information by numerical and graphical displays.

Dictation/transcription equipment may be employed in a business office for dictation of memoranda, letters, and other such materials which are later played back for transcription to a typewritten document. Typically, dictation is recorded on cassettes of magnetic recording tape; and a given cassette may store several items of dictation of different types, of differing length, by different authors, and having different priorities of transcription.

Heretofore, detailed information about the location of a dictated item on the recording tape, the length of that item, its author, the priority in which each item should be transcribed, and other such relevant dictation/transcription information has not been available readily to the transcriptionist. It would be advantageous if such information is recorded for display. In some dictation/transcription machines having electronic displays, information helpful to the transcription of recorded material may be lost (or "erased") upon shut down or power deenergization of the machine.

SUMMARY OF THE INVENTION

The foregoing problems are overcome and other advantages are attained in a dictation/transcription system of the present invention which includes a display device that displays information relating to recorded dictation, including the location of a recorded message, the length of that message, identification of the author, time, date, etc.

The display presents a graphical portrayal of the locations of recorded messages by means of, for example, three separate bar graphs, one preferably formed of one or more segments of visual indicators which, when energized, displays representations of the length of each of the messages. The segments representing the length of a message are grouped in a "block", and the positions of the blocks represent the relative positions of the recorded messages. Also displayed (preferably by flashing of the segment blocks) are representations of the type or nature of a message, such as a "letter", "priority letter", or the like. One of the bar graphs preferably displays a cursor which represents the present position on the recording medium. Yet another bar graph represents the locations of "instructions" and "notes". Flashing of segments indicates "priority" and "special" notations. Further data, such as author identification, length of a recording tape, time, and date are presented by alphanumeric symbols.

In accordance with the invention, the display device may be formed integrally with a recording/playback device, or may be adapted to operate in a modular system as a separate module which can easily be connected to and disconnected from a recording/playback module.

Preferably, both the display device and the recording/playback device are provided with microprocessors and a communication link which couples command signals and control information signals between the modules, thereby enabling the modules to cooperate in performing various system functions relating to the recording and retrieval of messages, and the display of information.

One aspect of the invention is the recording of useful non-message data on the recording medium by storing a complete history of usage (e.g., message type, location, length, author, etc.) on the medium along with recorded dictation. When a recording tape such as a tape cassette is used, the recorded cassette takes on the attributes of an "intelligent" cassette.

In one embodiment, tape motion pulses are transferred from the recording/playback device via a communication link to the microprocessor in the display device, the latter operating in accordance with a programmed routine to attain a linear representation of the present position of the recording tape which, in turn, is indicated by the cursor on the display device.

During dictation of a message, successive segments of one of the bar graph displays are energized. A cue signal, which may be generated by the operation of a button on a handheld microphone, interrupts the sequence of segments with a "blank" space (e.g., de-energized segment) to indicate the end of a message such as a letter or report. The cue signal also commands the microprocessor of the display device to store in internal memory the point of initial dictation of the first message and, also the point at which the current message ended. In addition, author identification, date, time and other related data (if desired) are stored in internal memory.

As a nature of the present invention, all of this information is also recorded on the recording tape alongside the recorded dictation.

Preferably, this display data is recorded as FSK tones. Later, upon completion of the use of the recording tape, the operator may press a "finish" cue button on the display device to command the microprocessor to transfer all the display data from an internal memory to the recording tape for recording as a summary block of data.

In accordance with a preferred aspect of this invention, the display data that is stored in the internal memory and that is recorded on the recording tape also represents the type of message that has been recorded. Such message-type data distinguishes between "priority" and regular letters as well as between instructions and special notes.

In the event that the display data is erased from the internal memory or the cassette is transferred to another system, it can be regenerated simply by scanning the tape. An operator may request such scanning by pressing a "display" button on the display device. Advantageously, the tape may be scanned in the forward direction or in the reverse (rewind) direction. During scanning, the display microprocessor, via the recording/playback head assembly, effectively "reads" whatever display data has been recorded to construct a display presentation. Should the summary data block be read during scanning, the display presentation is constructed, stored and displayed immediately. "Priority" letters, "instructions" and the like are suitably identified and may be searched and accessed directly for immediate transcription from the tape.

BRIEF DESCRIPTION OF THE DRAWING

The following description, taken by way of example, is best understood in conjunction with the accompanying drawings wherein:

FIG. 10 is a schematic representation of display segments included in the display module.

With reference to FIGS. 1 and 2, there are shown, respectively, a recording/playback device 10, and the recording/playback device electrically connected to a display device 22 incorporating the present invention. These devices are more fully described in copending application Ser. No. 895,006, Filed: Aug. 8, 1986, Titled: MODULAR DICTATION/TRANSCRIPTION SYSTEM (DIC-527) and assigned to the assignee of the present invention, the disclosure thereof being incorporated herein by reference. The display device and the recording/playback device may be combined in a single unitary construction, or may be constructed in modular form in which the recording/playback device and the display device may be connected to each other, and disconnected from each other, as may be desired to provide for a display of recording-playback functions. By way of example, the following description is directed to a modular form of the recording/playback device and the display device, it being understood that the present invention is equally applicable to a unitary construction of the recording/playback device and the display device.

Figure 1:
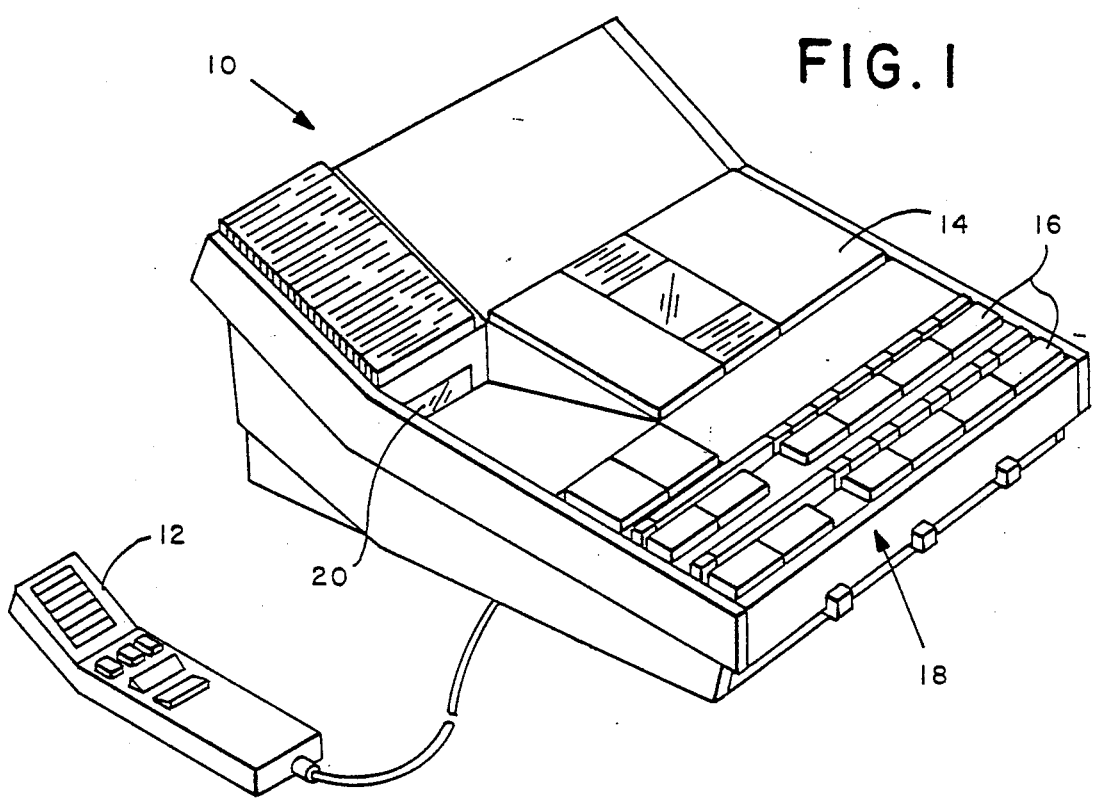
FIG. 1 a stylized view of a recording/playback device adapted for interconnection with a modular display unit in the present invention.

The recording/playback device is shown in FIG. 1 as a module 10 which is operable as a stand-alone unit for the recording and playback of sound, particularly voice. A microphone 12 is shown connected to the module 10 for use by personnel to record a spoken message on a recording medium such as magnetic tape within a cassette (not shown in FIG. 1) located within a compartment 14. Push buttons 16 of a keyboard 18 are operably connected with a tape transport (not shown in FIG. 1) for advancement and rewind of the tape. The module 10 includes a display 20 which, for example, provides a numerical read-out of present position of the tape.

Figure 2:
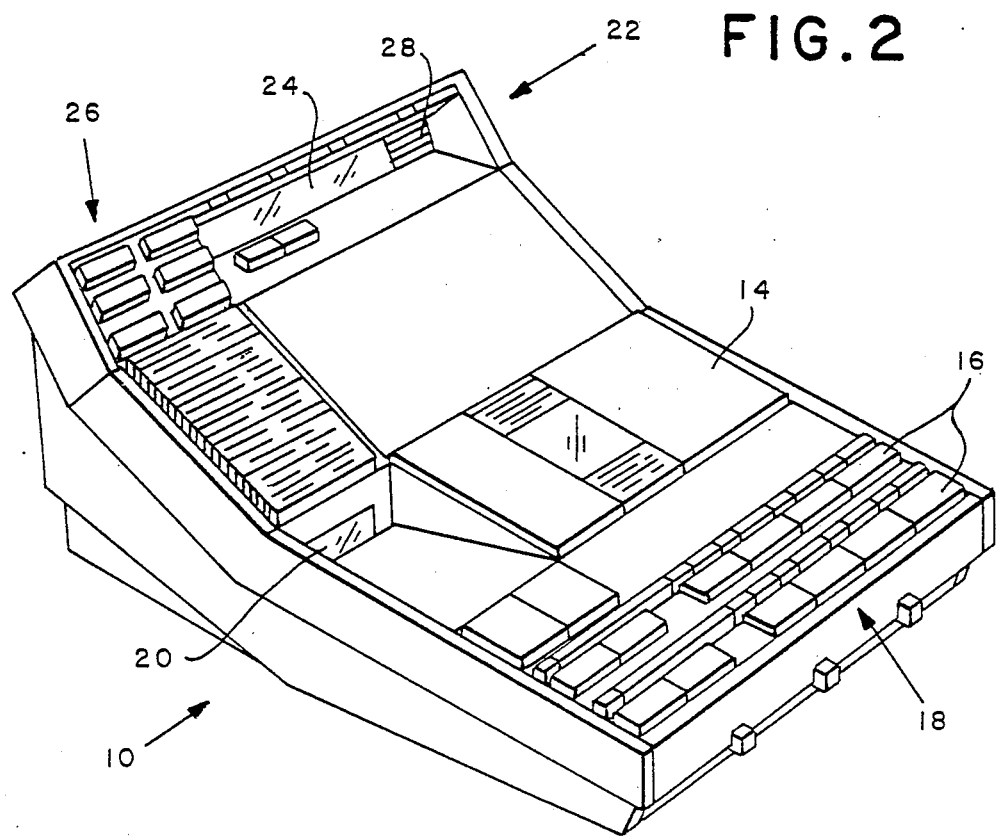
FIG. 2 the modular display unit of the present invention coupled to a dictation/transcription device comprising the device of FIG. 1 with a display module connected thereto for providing additional functions useful for dictation and transcription.

FIG. 2 shows a display module 22 which may be connected to the recording/playback module 10' to present additional information relating to dictation and transcription functions. For example, the display module 22 presents a plurality (preferably three) of bar graph displays composed of individual segments of visual indicators such as LED's, LCD's or the like which appear as display 24. Preferably, the display 24 is constructed as a liquid crystal display (LCD), with the aforementioned segments appearing as dark segments on a light background as shown in FIG. 10 though, if desired, the display may present the segments as lighted segments on a dark background.

Successive segments form blocks which have lengths proportional to recorded messages such as letters, memos, and reports. The segments in a block may be made to flash to indicate a "priority" item which is to be typed immediately by a transcriptionist. Additional useful information is presented in alphanumeric form in a region 28 on the right side of the display 24, such as the identification of the author who dictated a message and the length (in minutes) of the message. The date and time of message is displayed in the display 20 of module 10.

Figure 3:
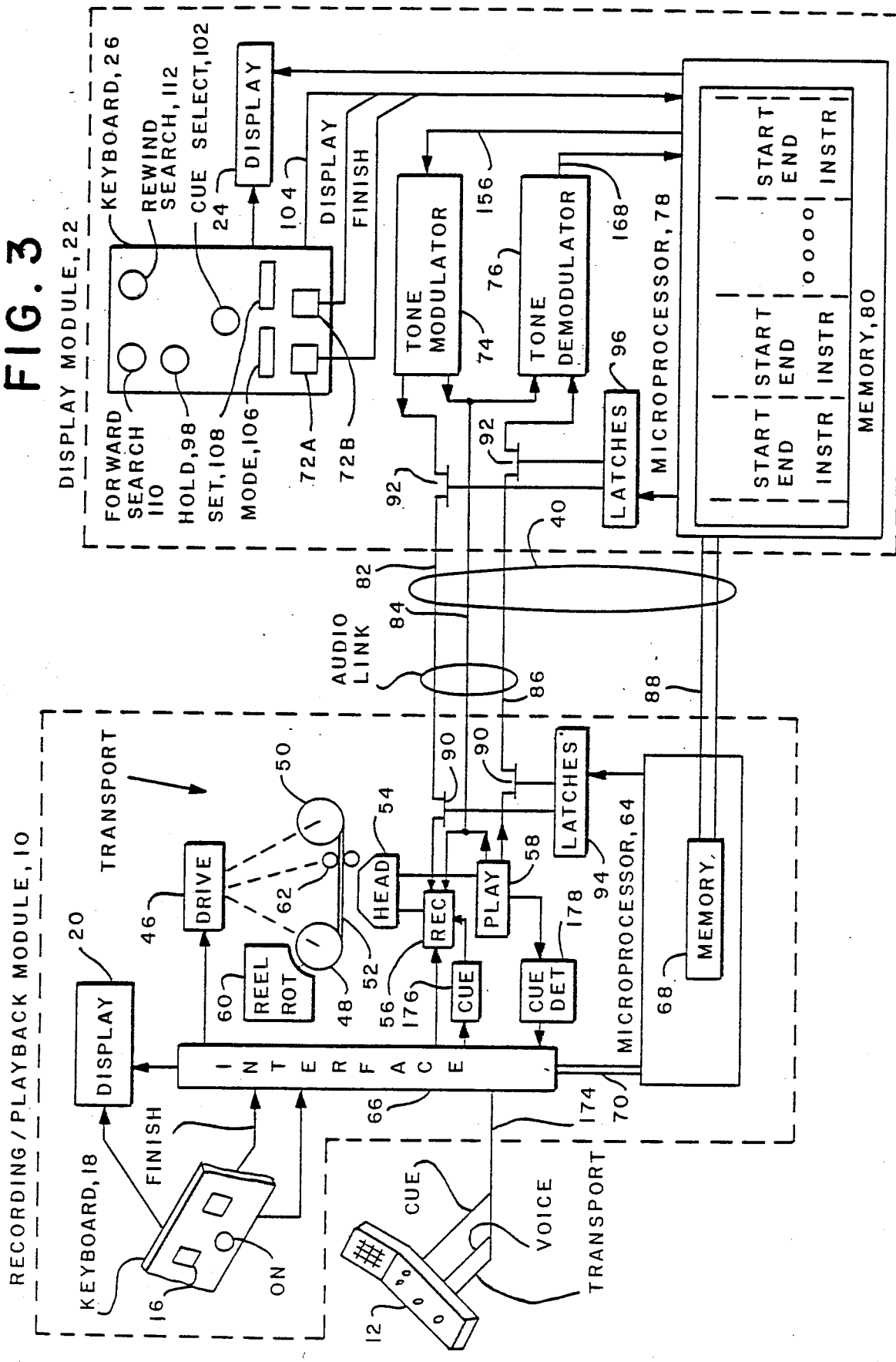
FIG. 3 is an electrical block diagram of the modular interconnected system of FIG. 2.

FIG. 3 is a block diagram of electrical circuitry of the two modules 10 and 22. The recording/playback module 10 comprises a drive 46 for rotating a supply reel 48 and a takeup reel 50 to transport a magnetic recording tape 52 past a recording/playback head 54 for the storing and retrieval of audio and display data signals on the tape. The module 10 further comprises a recording circuit 56 and a playback circuit 58 which connect with the head 54, and a rotation detector 60 which is positioned alongside the supply reel 48, for example, for detecting rotation thereof. A capstan 62 is operated by the drive 46 for maintaining a constant speed of travel of the tape 52 during record and playback operation. As the tape 52 unwinds from the supply reel 48, the effective diameter of the supply reel 48 becomes smaller causing its rotational speed to increase in view of the constant linear speed of the tape driven by the capstan 62. Therefore, the detector 60 detects a continuously increasing rate of rotation during forward motion of the tape 52.

As shown in FIG. 3, the connection of the microphone 12 to the module 10 is accomplished via the interface unit 66, the connection being shown as a set of lines including a line for the cue signal, a line for voice communication, and a line for signals controlling transport motion such as forward, fast-forward and fast-rewind. The voice line from the microphone 12 is understood to include conductors for transmission of signals from the microphone to the recording circuit 56 and for playback of signals from the playback circuit 58 via a small speaker (not shown) within the microphone 12. The cue signal line activates an oscillator 176 to generate the cue signal which is supplied via the recording circuit 56 to the head 54.

The recording/playback module 10 also includes a microprocessor 64, which applies control signals via an interface unit 66 to the display 20, the drive 46, the recording circuit 56 and the playback circuit 58. Rotation signals in the form of motion pulses are produced by the rotation detector 60, and are coupled via the interface unit 66 to the microprocessor 64. A memory 68 coupled to the microprocessor 64 stores program data and other information useful in the operation of the microprocessor 64.

Digital signals are coupled between the interface unit 66 and the microprocessor 64 by a data bus 70. The interface unit also supplies signals from the keyboard 18 (partially shown in FIG. 3) to the microprocessor 40 which, in turn, controls display 20 and selects the operational functions of the module 10 and also of the module 26.

A "finish" pushbutton 72A on the display module 22 provides a signal indicating that an author has finished his dictation. This signal initiates an operation in the modules 10 and 22 by which a complete history of the types of recorded messages, their locations and their author(s) are recorded on the tape 52 as a digitally formatted message placed alongside the audio information, or dictation, that also is recorded on the tape. Another pushbutton 72B on the display module 22 may be activated by an operator to command the display module 22 to display this recorded history on the display 24, preferably in bar graph form as mentioned above.

In a preferred embodiment of the invention, the presentation on the display 24 develops as the author dictates into the microphone 12 and tape 52 advances. One segment of the bar graph display 24 of FIG. 10, for example, is energized by way of example, for each 30-second interval of dictation. A graph length of ten segments would indicate, in the foregoing example, a dictation time of five minutes. The author indicates the end of a dictated passage, memo or report by pressing a cue button on the microphone 12. This end-of-dictation is represented by the omission of a segment (i.e., the segment is not energized) and the properly de-energized segment is determined as a function of the number of motion pulses that have been generated by rotation detector 60 of the recording/playback module 10. Pressing the cue button also activates the modules 10 and 22 to store the end of dictation point of the dictated material on the recording tape 52, as well as the author's identification, point of initial dictation, time and date of dictation of that particular message. Also, when the cue button first is activated, the original starting point at which dictation on the tape commenced is stored. This display data for all recorded messages is recorded on the recording tape 52 in the form of a summary block of data in response to the operation of "finish" button 72A. At a later time, after a power failure, for example, when modules 10 and 22 are subsequently reactivated, or if the tape is transferred to another similar system, the display module 22 can regenerate the graphical display from the display data stored on the recording tape 52 upon command from the pushbutton 72B.

By way of example, the display data that is transferred between modules 10 and 22 is in the form of a sequence of audio tone signals. In order to produce and recover these tone signals, the display module 22 includes a tone modulator 74, a tone demodulator 76 and a microprocessor 78, in addition to the aforementioned display 24 and a keyboard 26. The microprocessor 78, which may be an NEC Model 7500, or similar device, includes a memory 80 for storing program data and the aforementioned display data.

A connector 40 interconnects the two modules 10 and 22 and comprises an audio link composed of lines 82, 84 and 86, and a digital data bus 88. The bus 88 couples digitally formatted signals between the two microprocessors 64 and 78. The line 82 couples audio signals from the tone modulator 74 to the recording circuit 56. The line 86 couples audio signals from the playback circuit 58 to the tone demodulator 76. The line 84 is a return line for the signals on both lines 82 and 86. Analog switches 90 in the form of field effect transistors (FET's) in the recording/playback module 10, and analog switches 92 in the form of FET's in the display module 22 permit either of the modules 10 and 22 to be connected and disconnected from the audio lines 82 and 84. The switches 90 are operated by the microprocessor 64 via latches 94. The switches 92 are operated by the microprocessor 78 via latches 96.

If desired, the audio link can be extended to enable the connection of the audio lines of the display module 22 to a further recording/playback module (not shown), together with a concomitant extension of bus 88. Thereby, the display module 22 may be adapted to function with two recording/playback modules. In such adaptation, as described in copending application Ser. No. 894,583, Filed: Aug. 8. 1986. Titled: DISPLAY FOR MODULAR DICTATION/TRANSCRIPTION SYSTEM (DIC-528) the memory 80 of the display module 22 stores display data supplied from both recording/playback modules.

Keyboard 26 of the display module 22 includes a hold button 98, a cue select button 102, a FORWARD SEARCH button 110 and a REWIND SEARCH button 112. These buttons are electrically connected via line 104 to the microprocessor 78 for selecting operating functions of the microprocessor. The hold button 98 is useful in retaining a presentation on the display 24. The cue select button 102 is useful during transcription because it allows an operator to select a type of message to be accessed such as a letter, a "priority" letter, an instruction or a "special" note. Recorded messages are characterized as one of the foregoing types by operating the cue buttons on microphone 12, and a specific cue designation is recorded on the tape 52 (along with other data, such as the author's identification, point of initial dictation, the date, the time, and the end point of the message). In one particularly advantageous embodiment of the display module 22, each message type (or cue designation) may be selectively displayed (or alternatively highlighted) along the bottom edge of the display 24; and the cue designations are selected in sequence by successive pushing of the cue select button 102.

When tape 52 moves past the head 54, a cursor indicating the tape position, moves along the display 24 in the horizontal direction to show the tape position. The cursor may appear as a dark or light square positioned beneath the array of segments of the "letter" display graph on the display 24, such as represented by cursor display 24c of FIG. 10.

Information such as the author identification, the date and the time of dictation can be entered by use of two pushbuttons 106 and 108 referred to, respectively, as the mode button and the select button on keyboard 26. If desired, these buttons may be concealed from view and from inadvertent operation. The mode and select buttons 106 and 108 are operatively connected via the line 104 to the microprocessor 78 for entering and storing the foregoing information. Such information can be entered conveniently by pressing the mode button 106 successively for selecting author, identification, the date, and the form of time (12 hour or 24 hour clock) to be entered. The select button 108 is pressed to cycle through the numerals of the author identification, the time and date. This data also is recorded from microprocessor 78 onto tape 52.

Further details of the circuitry of FIG. 3 will now be described with reference to FIGS. 4-6 followed by the flow charts of FIGS. 7-9.

Figure 4:
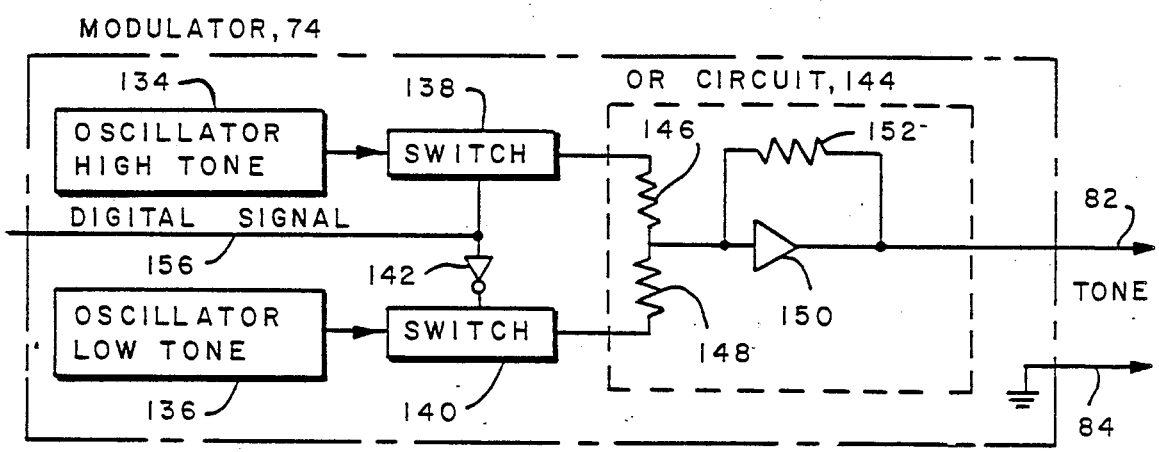
FIG. 4 shows one embodiment of a tone modulator that may be used in the display module of the present invention.

With reference to FIG. 4, the tone modulator 74 comprises two oscillators 134 and 136, two switches 138 and 140, a digital inverter 142 and an OR circuit 144. The OR circuit 144 comprises two summing resistors 146 and 148, and an amplifier 150 with a feedback resistor 152. In operation, the oscillator 134 produces a higher frequency tone signal (e.g., 1800 Hz) and the oscillator 136 produces a lower frequency tone signal (e.g., 1000 Hz). These signals are coupled by the switches 138 and 140 to the OR circuit 144 to be outputted on the audio line 82 (FIG. 3) as FSK (frequency shift keying) signals. A digital signal applied by the microprocessor 78 via line 156 to the switches 138 and 140 operates those switches to connect one or the other of oscillators 134 and 136 to OR circuit 144. The inverter 142 provides for alternate operation of the switches 138 and 140 such that a logic-1 signal on line 156 operates the switch 138 to output a high frequency tone on line 82, and a logic-0 signal on line 156 operates the switch 140 to output a low frequency tone on the line 82.

In the OR circuit 144, the summing resistors 146 and 148 couple signals respectively from the switches 138 and 140 to the negative input terminal of the amplifier 150. Thereby, the modulator 74 converts the digital signal on line 156 to audio tone FSK signals on line 82.

Figure 5:
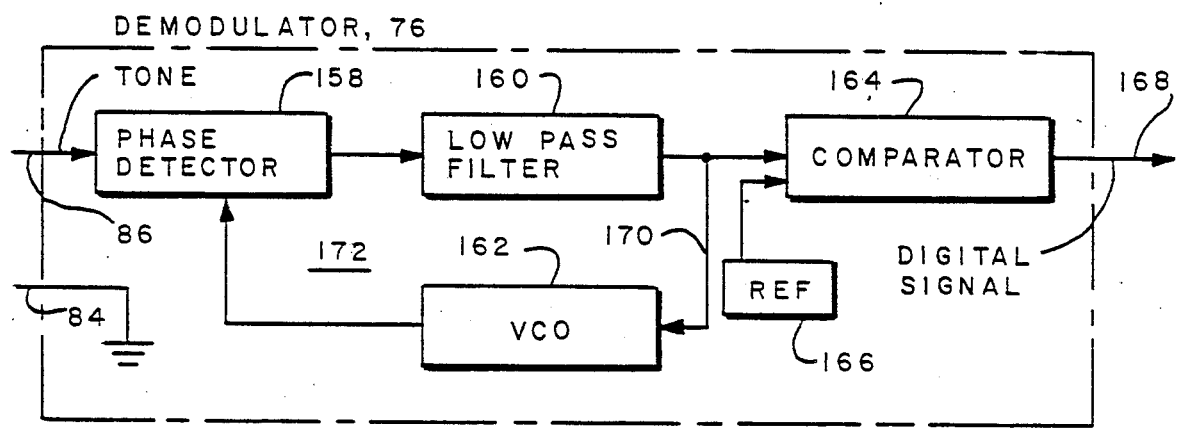
FIG. 5 shows one embodiment of a tone demodulator that may be used in the display module of the present invention.

FIG. 5 shows details of the tone demodulator 76, the demodulator comprising a phase detector 158, a low-pass filter 160, a voltage controlled oscillator 162, a comparator 164, and a source 166 of a reference signal for the comparator 164. The audio tone signal on line 86 (FIG. 3) is applied to an input terminal of the phase detector 158. The comparator 164 produces a digital signal which is applied via line 168 to the microprocessor 78 (FIG. 3).

In operation, the oscillator 162 oscillates at a frequency dependent on the amplitude of a signal outputted by the filter 160 via line 170 to the oscillator 162. The phase detector 158, the filter 160 and the oscillator 162 comprise a phase-locked loop 172, the operation of which loop is well known. The detector 158 outputs a signal to the filter 160 having an amplitude proportional to a difference in phase between the input signal on line 86 and an output signal of the oscillator 162. The filter 160 integrates the output signal of the detector 158 to provide a smoothly varying signal on line 170 for driving the oscillator 162. The bandwidth of the filter 160 is set in a well-known fashion to allow the loop 172 to follow the frequency of the audio tone line 86 as the tone frequency jumps between lower and higher frequencies. The higher tone frequency represents a logic-1 signal and the lower tone frequency represents a logic-0 signal for the transmission of display data.

It is noted that the frequency control signal on line 170 increases in amplitude to provide the higher output frequency of the oscillator 162, and decreases in amplitude to provide the lower output frequency of the oscillator 162. The signal on line 170 is applied to one input terminal of the comparator 164, a reference signal from the source 166 being applied to a second input terminal of the comparator. The magnitude of the reference signal lies between the two amplitude values of the signal on line 170. The comparator 164 outputs a logic-1 signal in response to a high output voltage on line 170, and outputs a logic-0 signal on line 168 in response to a low output voltage of the signal on 170. Thereby, the demodulator 76 converts the audio tone FSK signals on line 86 to digital signals on line 168. A digital transmission rate of, for example, 545 baud is employed in the preferred embodiment of the invention.

Figure 6:
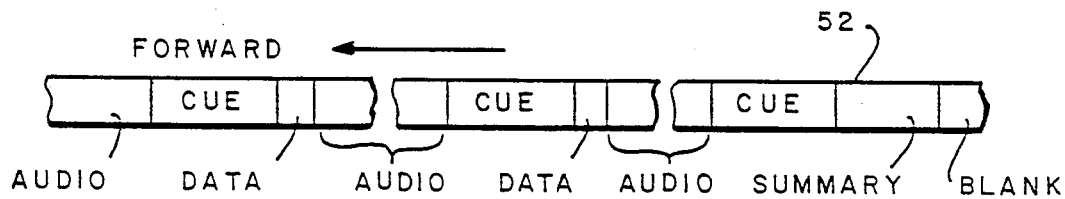
FIG. 6 shows an arrangement of regions of recorded audio signals and recorded display data signals on a recording tape.

FIG. 6 shows diagrammatically a section of the recording tape 52. Portions of the tape carry recorded audio signals, while other portions of the tape carry recorded display data for operation of the display 24 of the display module 22. While an audio portion of the tape 52 may be relatively long, extending possibly through almost the entire length of the tape, the display data portion is relatively short.

The forward direction of tape movement in FIG. 6 is toward the left. It is seen that the display data is recorded in a "cue block" after the corresponding audio portion so as to include information as to the length of that audio portion. The operator signifies his conclusion of the dictation of a message (e.g., end of letter) by operating a cue button to record a cue signal, which signal is recorded as a 15 Hz signal (for example) on a region of the tape between the end of the audio passage and the beginning of the corresponding cue block display data portion.

During fast-forward and fast-reverse movement of the tape 52, the 15 Hz cue signal appears as a much higher frequency (in the range of 150-450 Hz) due to the rapid motion of the tape. Nevertheless, the length of the recorded portion of the cue signal is sufficient to allow the record/playback module 10 to detect the cue signal during fast-forward and fast-reverse movement so as to enable the drive 46 to stop the tape.

As shown in FIG. 6, a summary region is recorded in a summary data block at the end of the portion of the tape 52 containing recorded information. The summary data block contains data summarizing all of the display data recorded in the previous data regions and, as has been noted hereinabove, contains sufficient information to recreate the complete presentation of the recorded messages on the display 24 of the display module 22. The display data of the cue block data regions and the display data of the summary data block region are provided by the display module 22, as noted above, upon an indication by the operator that he has completed dictation of a message and that he is finished with the cassette, respectively. These operator indications are provided by use of the cue button on the microphone 12 and by use of the finish button on the keyboard 18.

As an example in the use of the display module 22 for presenting information useful in the transcription of material from a previously recorded tape cassette, a transcriptionist may command the display module 22 to present the above-described bar graph display of the previously recorded messages as follows: After insertion of a previously recorded cassette, the operator pushes the "display" button 72B on the keyboard 26 of the display module 22 to activate the microprocessor 78 to read the information provided in the summary data block of the tape 52 for presenting the information on the display 24. The tape 52 is then scanned in either forward or rewind directions, depending upon whether FORWARD SEARCH button 110 or REWIND SEARCH pushbutton 112 is actuated, to read the stored information from the cue blocks of tape 52 into the microprocessor 78. If the "display" pushbutton is actuated, the summary data block is read first, and the entire display can be presented immediately, otherwise the display is generated piecemeal as the display data of each cue block is read. The operator selects the scan direction for accessing the summary data block by, for example, a "press-release" operation of pushbutton 72B to establish the rewind direction, or a "press-hold" operation to establish the forward direction. During the scanning, the finish cue signal preceding the summary data block or end of message cue signal preceding each cue block is detected by a detector 178 (FIG. 3), the detector 178 outputting a control signal via the interface unit 66 to the microprocessor 64.

During rewind scan, the microprocessor 64 responds by directing the drive 46 to stop the tape when a 15 Hz cue signal is detected, after which the tape is played in the forward direction. This brings the summary data block or a cue block past the head 54 for communication via the audio link to the tone demodulator 76 and to the microprocessor 78. During forward scan, the tape is advanced in the fast forward mode and is brought to a halt in response to the detection of a cue signal. In view of the fact that the tape may overshoot the cue signal position and, consequently, miss a part or all of the following display data portion, the microprocessor 64 is programmed to automatically command a back-up of the tape transport by a preset amount which brings the head 54 behind the display data portion. Thereupon, the tape advances in the forward direction and the display data is played back to be outputted to the microprocessor 78 of the display module 22. Thereafter, the microprocessor 78 commands the transport to advance further in the forward direction to accumulate data of other ones of the cue blocks of the tape 52, and finally to accumulate all of the display data in the summary data block. In this way, information relating to the messages recorded on a tape cassette is presented to the modules 10 and 22.

The tape motion pulses generated by reel rotation detector 60 are employed by the microprocessor 78 for positioning the segments of the bar graph presentation. The nonlinear relationship between reel rotation and tape advance may be converted to a linear relationship by microprocessor 78 which employs a linearization procedure of the type described in U.S. Pat. No. 4,410,923, assigned to the assignee of the present invention, resulting in a substantially linear presentation on the display 24. The tape motion pulses are transmitted over the bus 88 under control of the microprocessor 64.

Figure 7:
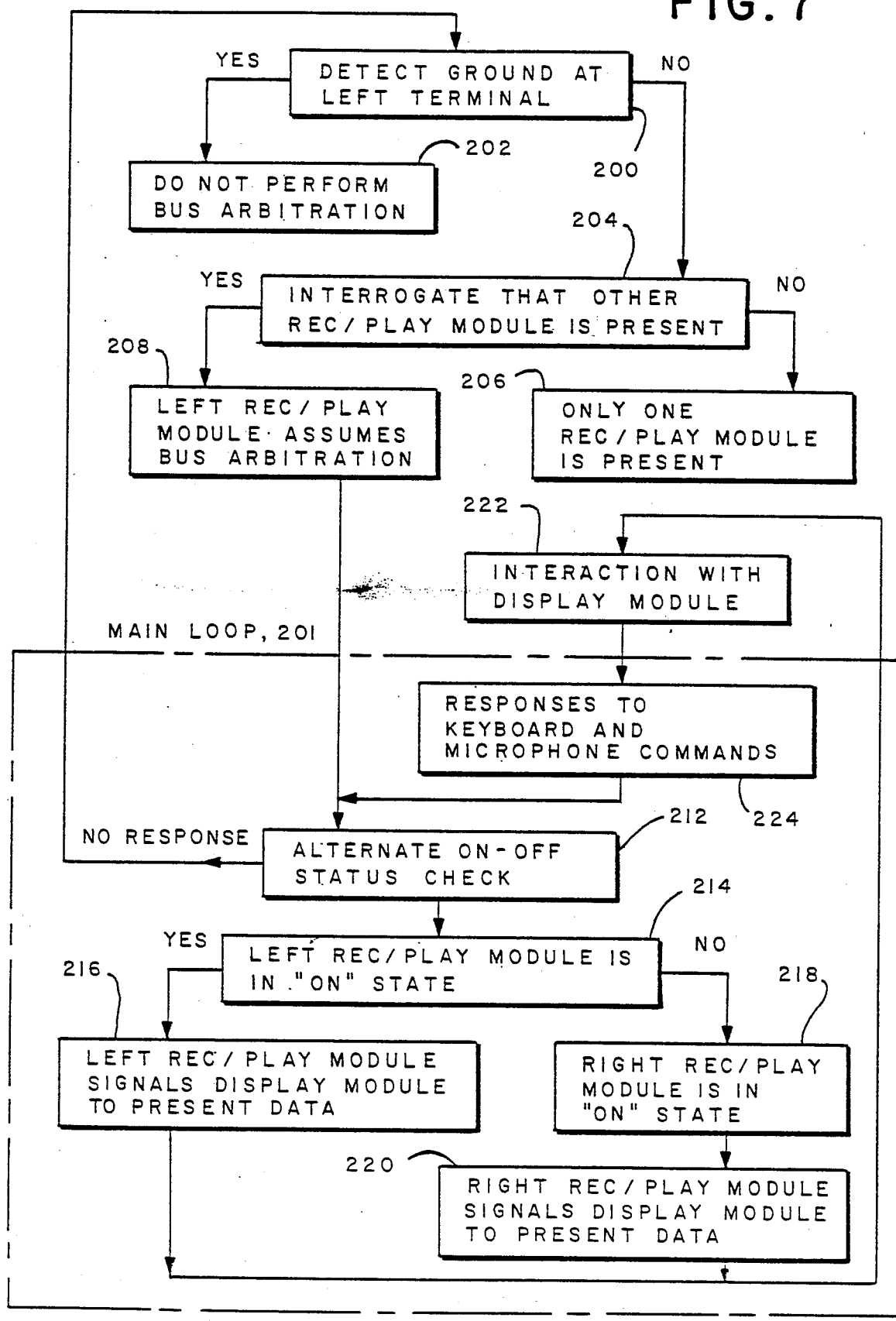
FIG. 7 is a flow chart representing a relevant portion of the operation of the microprocessor included in the recording/playback module of FIG. 1.
Figure 8:
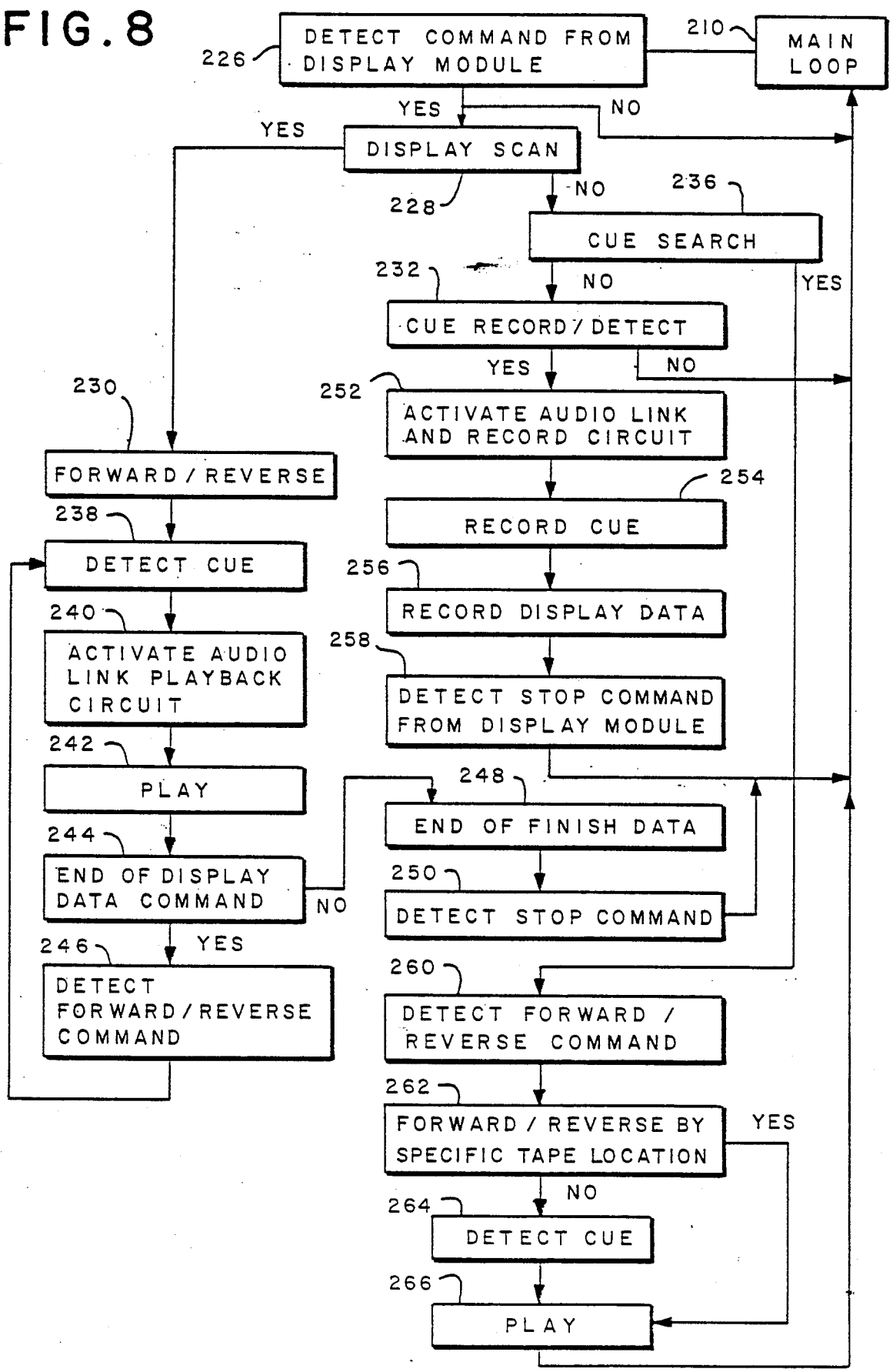
FIG. 8 is a flow chart representing the relevant operation of the microprocessor included in the recording/playback module record and detect display data in accordance with present invention.

FIG. 7 is a flow chart of the overall function of microprocessor 64 including a main loop 210 which branches to block 226 of the flow chart shown in FIG. 8. Block 226 (FIG. 8) begins the interaction between the display module 22 and the recording/playback module 10. Block 226 represents that the microprocessor of the module 10 looks for a command from the display module 22. If no command is received, the operation reverts to the main loop 210. If a display scan (block 228) command is received from the display module 22, the operation shown in FIG. 8 continues to block 230 wherein the module 10 detects whether the cue signal scanning is to be accomplished in the forward or reverse (rewind) direction of movement of the recording tape 52, depending upon the operation of the "display" pushbutton. If no display scan command from display module 22 is detected, the operation proceeds to block 236 to detect a cue search command, wherein the module 10 operates the tape transport to search the recording tape 52 for an end-of-message cue signal.

At block 230, the module 10 searches tape 52 in the selected forward or the rewind direction for a cue signal. When a cue signal is detected (block 238) the tape drive 46 stops the movement of the tape 52, and the audio link is activated by operation of the switches 90 and 92 (block 240) for coupling signals played back from the tape 52 to the display module 22. The tape transport is operated to playback display data (block 242) from the cue block of the tape 52 to the display module 22. Playback continues until the end of the display data (block 244). Module 10 then again receives a forward/reverse command (block 246) and activates the tape transport to search for the next cue signal. The cycle is repeated upon return to block 238 wherein the module 10 attempts to find the next cue block of the tape 52 containing display data.

With reference again to block 244, if the end of display data is not sensed but, rather, the end of summary data (recorded in a summary data block is present, this end of summary data is detected at 248). The tape 52 continues to move past the head 54 until all of the summary data block is read from the tape for transference to the display module 22. Thereupon, the module 10 detects a stop command (block 250) indicating the end of the summary data block, at which point the tape drive 46 is stopped and operation reverts to the main loop at block 210.

If the command from the display module is neither a display scan command nor a cue search command, the received command may be a cue record command. Upon detection of a cue record command, module 10 implements the procedure for the recording of end of message display data or summary display data previously accumulated within the memory 80 of the display module 22. This data includes the locations of the start point of the first message (usually the beginning of tape) and the end points of each message dictated on the tape, as well as message characterizing signals (such as a letter, "priority" letter, an "instruction" or a "special" note, all of which are displayed by respective, distinctive displays). Also included are the identification of the author, the date, and the time of recording. If a display scan command (block 228) is not detected, the module 10 begins the procedure of transferring this information from the memory 80 of display module 22 to the summary data block or end of message region of the recording tape 52. The procedure is implemented by activating the audio link 82 and record circuit 56 (of FIG. 3) at block 252, provided that a cue search command (block 236) is not received, but a cue record command (block 232) is detected. The sequence of recorded information begins with the recording of the cue signal (block 254) this being followed by the recording of the display data (block 256). The recording process stops upon detecting a stop command (block 258) from the display module 22, indicating that all of the display data has been read from memory 80. Thereafter, the operation reverts to the main loop 210.

With reference to block 236, if the command from the display module 22 is a cue search command to find a cue data field on the recording tape 52, this is implemented by the detection in block 260 of a forward or reverse tape movement command (e.g., a forward search or a rewind search command). Thereafter, at block 262, the module 10 may be provided with a command to advance to a specific location or to a specific type of message on the recording tape. If no such command is given, the transport continues to advance the tape in either the forward or reverse direction until a cue signal is detected at block 264. Thereupon, playback of the cue data field (typically, the cue block) commences as indicated at block 266. If, at block 262, a specific location is designated, then the drive 46 moves the tape 52 by either fast forward or fast rewind to the designated location after which playback (block 266) commences and the operation reverts to the main loop at block 210.

During the interaction between the recording/playback module 10 and the display module 22, both the microprocessor 64 of the module 10 and the microprocessor 78 of the display module 22 operate to provide the functions of data storage and display. The operation of the microprocessor 64, during this interaction, has been described in the flow chart of FIG. 8. The operation of the microprocessor 78, during this interaction, will now be described in conjunction with FIG. 9.

Figure 9:
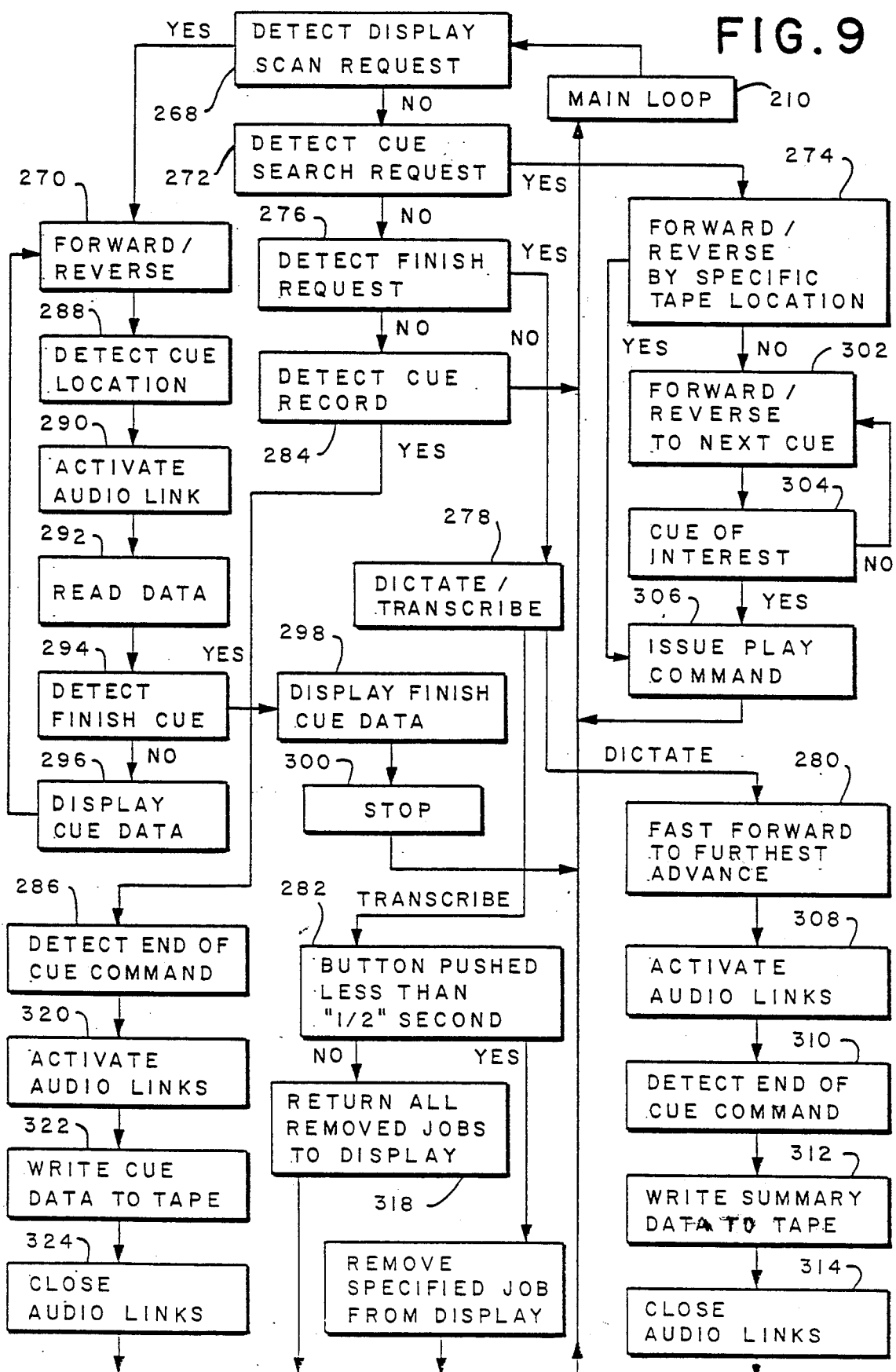
FIG. 9 is a flow chart of the relevant operation of the microprocessor included in the display module for controlling the operation of and interaction with the recording/playback module.

As shown on FIG. 9, the operation begins with the detection of a display scan request at block 268, which request is initiated by an operator pushing the button 72B of display module 22. Detection is achieved after completion of the procedure of the main loop. If the display scan request is detected, the operation proceeds to block 270 to supply either a forward tape drive command or a reverse command to module 10, depending upon the operation of pushbutton 72B, as mentioned above. In the event that no request for a display scan is detected, the operation proceeds to block 272 for detection of a search request. Such request is made by pushing the Forward Search 110 or Rewind Search 112 buttons. The cue select button 102 of the display module 22 is used in conjunction with the FORWARD SEARCH or the REWIND SEARCH buttons to access, for example, the next "priority" letter, or the next instruction, or the next "special" note. In the event that such request is received, the operation proceeds to block 274 to sense whether the search is to proceed by forward or reverse movement of the recording tape 52, depending upon the selection by the operator of a forward or reverse search request, as mentioned above. In the event that no request for cue search is detected at block 272, the operation proceeds to block 276 wherein the display module 22 attempts to detect if pushbutton 72A has been operated to initiate a finish request. If a finish request has been detected, the operation proceeds to block 278 to sense if module 10 is in its dictate or transcribe mode. If the former operation continues to block 280 and if the latter to block 282. In the event that no finish request is detected at block 276, the operation proceeds to block 284 for the detection of a cue signal record command, generated by the operation of the cue pushbuttons on microphone 12. If such a cue record command is detected from the module 10, the operation of the module 22 proceeds to block 286 to detect an end-of-cue command. In the event that a cue signal is not to be recorded, the microprocessor returns from block 284 to the main loop 210.

With reference to the block 270, in response to a display scan request, microprocessor 78 commands microprocessor 64 to advance the recording tape 52 for detection of a cue region at block 288. Thereupon, at block 290, the audio link is activated by switches 92 and 90 to couple data between the tape 52 and the display module 22. The reading of data is indicated at block 292, which reading continues until the detection of a finish cue at block 294. If no finish cue is detected, the data read out of the sensed cue block recorded on the tape 52 is displayed at block 296, after which the operation reverts to block 270 for continued advancement of the recording tape to the next cue position. If, at block 294, a finish cue is detected, the summary display data is displayed as indicated at block 298, and the data reading process stops at block 300 whereupon the operation reverts to the main loop at block 210. It will be appreciated that the display is as follows: the length of a letter or "priority" letter is indicated by the number of successive segments energized in array 24l of display 24, and a letter is represented by steady state energized segments whereas a "priority" letter is represented by flashing segments. An instruction is indicated by energizing the particular segment in a separate array 24i represent the location of that instruction. A "special" note is indicated in a manner similar to that for an instruction, but the segment is flashed.

With reference to the blocks 272 and 274, in the event that there is a request to search for a cue, but a specified tape location for a cue has not been requested, the operation advances to block 302 in which the recording tape is advanced in the forward or reverse direction, as requested by the operator, to reach the next cue block. If this cue is not the selected cue of interest (block 304), that is, a letter, "priority" letter, instruction or "special" note has been selected but the cue which is reached does not represent the selected cue, then the operation reverts to block 302 for advancement to the next cue. If, at block 304, the detected cue is the cue of interest, then the operation advances to block 306 wherein the display module 22 commands the module 10 to playback the tape 52 for reproducing the message. Alternatively, if at block 274, a specific tape location has been requested, then the tape drive 46 is directed by microprocessor 64 under command from microprocessor 78 to move the tape 52 by fast forward or fast rewind (as selected) to bring the tape to the designated location at which, at block 306, the tape is played back for reproduction of the recorded information. Thereupon, the operation reverts to the main loop at block 210.

With reference to blocks 276 and 278, upon detection of a finish request during dictation, microprocessor 78 commands microprocessor 64 to terminate the dictation process and advance the tape by fast forward (block 280) to the furthest advance point of dictated material. A cue signal is recorded; and thereupon, at block 308, the audio link is activated followed by detection of the end-of-cue command at block 310. This provides the site on the tape wherein the summary data is to be written. At block 312 the summary display data describing usage of the recording tape, which data had been stored in the memory 80, is coupled via the audio link for recording on the tape 52. Upon completion of the recording of the summary data block, the audio links are closed (block 314) after which the operation reverts to the main loop 210.

In the event that the finish request (block 276) is detected during a transcribe operation, the display 24 extinguishes the set of display segments representing the message which has just been transcribed or, alternatively, if those segments and others had been extinguished, the finish request re-energizes those segments. The extinguished segments leaves a space in the bar graph display which indicates to the transcriptionist those messages that have been transcribed. Block 282 determines if the finish button 72A is pushed for less than one-half second, which then extinguishes the segments that define a particular message, or if the finish button is pushed and held for more than one-half second to re-energize all of the segments which had previously been extinguished. Thereafter, operation reverts to the main loop 210.

With reference to blocks 284 and 286 for the detection of a cue record command during a dictate operation, the end of the cue record command is detected at block 286 followed by activation of the audio links at block 320. Thereafter, the display data associated with the completed message, such as the end point of the message, are supplied from microprocessor 78 to module 10 for recording in the cue block of the tape 52, as indicated at block 322. At the conclusion of the recording of the display data, the audio links are closed at block 324, and the operation reverts to the main loop 210.

It is to be understood that the above-described embodiment of the invention is illustrative only and that modifications thereof may occur to those skilled in the art. Accordingly, this invention is not to be regarded as being limited to the embodiment disclosed herein, but is to be limited only as defined by the appended claims.

What is claimed is:

1. A dictation/transcription system for the playing back of audio messages recorded on a record medium on which also is recorded a summary block of data relating to each of said messages, said summary block of data including data such as message type data representing the type of each respective message, message location data representing the location of each respective message on the record medium, and message length data representing the lengths of respective messages of at least predetermined types, said system comprising:

playback means for playing back said summary block of data; and display means responsive to the message type, message location and message length data played back from said summary block to display visual indications of the type, location and length of said recorded messages.

2. The system of claim 1 wherein said display means comprises at least one array of visual indicating segments, and means for selectively energizing said segments.

3. The system of claim 2 wherein the segments of said array are selectively energized to indicate respective message types.

4. The system of claim 3 wherein the segments of said array are selectively energized to indicate said locations of the recorded messages.

5. The system of claim 4 wherein the segments of said array are selectively energized to indicate message length.

6. The system of claim 5 further comprising manually operable means for de-energizing those segments of said array representing a type and length of one of said messages, which segments had been energized in response to the data played back from said summary block, provided said one message is the most recently transcribed message.

7. The system of claim 5 wherein said display means includes a cursor display operable to display the present position of said record medium, means for positioning said cursor display relative to the energized segments of said array, and manually operable means to de-energize all of the segments representing a recorded message if said cursor display is positioned relative to one of the segments representing that message.

8. The system of claim 7 further comprising means selectively operable to re-energize all of the segments that had been de-energized, thereby re-displaying the locations, lengths and types of messages recorded on said record medium.

9. The system of claim 5 further comprising manually operable means for selecting a particular type of message, and scan means for scanning said record medium to access a message of said selected type.

10. The system of claim 2 wherein said data represents the following mutually different types of messages: letters, "priority" letters, instructions, and "special" notes; and wherein said means for selectively energizing said segments of said display means provides a mutually distinctive visual indication of each type of message.

11. The system of claim 10 wherein said means for selectively energizing said segments of said display means comprises means for energizing successive indicator segments to represent the length of at least letters and "priority" letters, and means for deactivating selected indicator segments to represent the end of one letter or "priority" letter and the beginning of another.

12. The system of claim 11 wherein letters are displayed as substantially steady-state energized segments and "priority" letters are displayed as flashing segments.

13. The system of claim 12 wherein said display means comprises a second array of visual indicating segments; and means responsive to message type data representing instructions to provide steady-state energization of segments in said second array to represent the locations of recorded instructions, said means being responsive to message type data representing "special" notes to provide flashing energization of segments in said second array to represent the locations of recorded "special" notes.

14. The system of claim 1 wherein said record medium additionally has recorded thereon, immediately following each audio message, a data block containing data representing the identity of the author who recorded that message, the type and length of message that was recorded and the time at which that message was recorded; wherein said playback means plays back said data block; and further including digital display means responsive to the played back data block for displaying at least the author identity included in a played back data block.

15. The system of claim 14 further comprising search means for searching said record medium for data blocks recorded thereon; and wherein said display means is responsive to the data played back from each data block to display the type and length of the preceding message.

16. The system of claim 1 wherein said playback means includes manually operable means for initiating the playing back of said summary block data.

17. The system of claim 16 wherein said record medium comprises a magnetic tape, and wherein said manually operable means causes said tape to rewind and then enables said playback means to play back said summary block data.

18. A method of displaying indications relating to messages recorded on a record medium, comprising the steps of playing back from said record medium display data recorded in a summary block in which summary block display data relating to each of the recorded messages is contained, said summary block display data including data such as message type data representing the type of each respective message, message location data representing the location of each respective message on the record medium, and message length data representing the respective lengths of messages of at least predetermined types; and providing visual indications of type, location and length of said recorded messages in response to the played back display data.

19. The method of claim 18 wherein said step of providing visual indications comprises selectively energizing different visual indicator segments in an array to represent the type of a recorded message, the location of that message, and the length of that message.

20. The method of claim 14 wherein said message type data represents letters and "priority" letters; and wherein a letter is indicated by a series of successive, steady-state energized segments and a "priority" letter is indicated by a series of successive flashing segments, the number of segments in said series representing the length of said letter or "priority" letter.

21. The method of claim 20 wherein said message type data additionally represents instructions and "special" notes; and wherein an instruction is indicated by a steady-state energized segment and a "special" note is represented by a flashing segment, the location of the segment in an array representing the location of said instruction or "special" note.

22. The method of claim 21, further comprising the steps of selecting a particular type of message to be accessed, and scanning said record medium for said particular type.

23. The method of claim 22 further comprising the step of playing back the accessed message.

24. The method of claim 20 further comprising the steps of playing back the messages from said record medium; and selectively extinguishing a series of segments after the letter or "priority" letter represented thereby is played back.

25. The method of claim 20 wherein said record medium comprises a magnetic tape and further comprising the steps of providing a cursor indication representing the present position of said tape, moving said cursor indication into juxtaposition with a series of segments representing a letter or "priority" letter, and extinguishing all of the segments in the series to which said cursor indication is juxtaposed.

26. The method of claim 25, further comprising the steps of selectively re-energizing the segments in an extinguished series.

27. A modulator transcription system comprising:
a transcribe module having playback means for playing back from a record medium audio messages and a summary block of data relating to each of said messages, said summary block of data including data such as message, type data representing the type of each respective message, message location data representing the location of each respective message on the record medium, and message length data representing the lengths of respective messages of at least predetermined types; and
a physically independent display module connectable to said transcribe module to form an integral structure therewith and having means responsive to data such as the message type, message location and message length data played back from said summary block to display visual indications of the type, location and length of said recorded messages.

* * * * *